US008268168B2

(12) United States Patent
Mang

(10) Patent No.: US 8,268,168 B2
(45) Date of Patent: Sep. 18, 2012

(54) FILTER UNIT FOR SHOWER SYSTEM

(76) Inventor: Hoi Kwan Henry Mang, Shatin (HK)

(*) Notice: Subject to any disclaimer, the term of this patent is extended or adjusted under 35 U.S.C. 154(b) by 254 days.

(21) Appl. No.: 12/653,875

(22) Filed: Dec. 18, 2009

(65) Prior Publication Data
US 2011/0147286 A1 Jun. 23, 2011

(51) Int. Cl.
*B01D 29/60* (2006.01)
*B01D 29/13* (2006.01)
*B01D 35/157* (2006.01)

(52) U.S. Cl. ........ 210/137; 210/236; 210/449; 210/459; 210/460; 210/470

(58) Field of Classification Search .................. None
See application file for complete search history.

(56) References Cited

U.S. PATENT DOCUMENTS

| | | | | |
|---|---|---|---|---|
| 4,218,013 A | * | 8/1980 | Davison | 239/74 |
| 4,242,201 A | * | 12/1980 | Stephens et al. | 210/240 |
| 4,933,080 A | * | 6/1990 | Rundzaitis et al. | 210/232 |
| 5,070,553 A | * | 12/1991 | Chambers | 4/615 |
| 5,192,436 A | * | 3/1993 | Sasaki et al. | 210/264 |
| 5,545,314 A | * | 8/1996 | Parise et al. | 210/100 |
| 5,653,868 A | * | 8/1997 | Yanou et al. | 210/232 |
| 5,976,362 A | * | 11/1999 | Wadsworth et al. | 210/87 |
| 5,989,425 A | * | 11/1999 | Yonezawa et al. | 210/282 |
| 6,096,197 A | * | 8/2000 | Hughes | 210/94 |
| 6,123,837 A | * | 9/2000 | Wadsworth et al. | 210/87 |
| 6,267,887 B1 | * | 7/2001 | Hughes et al. | 210/266 |
| 6,372,132 B1 | * | 4/2002 | Williams | 210/232 |
| 7,077,272 B2 | * | 7/2006 | Shimada | 210/501 |
| 7,094,334 B1 | * | 8/2006 | Guzman et al. | 210/87 |
| 7,866,576 B1 | * | 1/2011 | Farley | 239/553 |
| 2004/0256303 A1 | * | 12/2004 | Talbot et al. | 210/232 |
| 2006/0207920 A1 | * | 9/2006 | Lackey et al. | 210/87 |

* cited by examiner

*Primary Examiner* — Nam Nguyen
*Assistant Examiner* — Madeline Gonzalez
(74) *Attorney, Agent, or Firm* — Raymond Y. Chan; David and Raymond Patent Firm

(57) ABSTRACT

A filter unit for a shower system includes a filtering housing and a filter core. The filtering housing includes a main body having a water inlet and a plurality of water outlets, wherein the water inlet is arranged to connect with the water supply tube so as to allow water to flow into the filtering housing through the water inlet, wherein one of the water outlets is connected with the second end of an extension tube of a shower head. The filter core is received in the filtering housing, and is capable of filtering unwanted substances in the water flowing from the water supply tube, wherein the filtered water is guided to flow out of the filtering housing through one of the corresponding water outlet to the extension tube and the shower head.

11 Claims, 11 Drawing Sheets

FILTER UNIT FOR SHOWER SYSTEM

BACKGROUND OF THE PRESENT INVENTION

1. Field of Invention

The present invention relates primarily to a shower system, and more particularly to a filter unit for a shower system which is capable of providing filtered water for showering or other related daily hygienic activities.

2. Description of Related Arts

A conventional domestic shower system usually comprises a holder mounted to a wall of a bathroom, a shower head selectively supported by the holder, and an extension tube connecting the shower head with a water supply. The domestic shower system is operated by a faucet so that when the user turns on the faucet, water comes out from the shower head for allowing the user to take a bath. Very often, this kind of domestic shower system is directly connected to a pre-existing water pipe, and that the water utilized for showering is identical to tap water used elsewhere in the particular dwelling in which the shower system is installed.

In the United States, for many reasons, tap water may not be suitable for drinking directly. A lot of filtration systems have been developed to filter unwanted or even harmful substances in tap water. For those who doubt the effectiveness of domestic water filtering system may choose to stop drinking tap water altogether, and subscribe bottled water for long term consumption. People may also use bottled water or filtered water for cooking purpose.

Despite this awareness of the potential harm imparted from drinking or using tap water, almost every family uses unfiltered or untreated tap water for typical personal hygienic activities, such as taking shower or brushing teeth. What most people do not know or unaware of is that unwanted or harmful substances contained in tap water may find a way to enter human body through human skin. Moreover, when people take shower or brush his or her teeth by using untreated tap water, they may inadvertently swallow a small amount of tap water and this may cause health problem when this situation persists for an extended period of time.

As a matter of fact, almost every domestic dwelling does not have some sorts of filtering systems equipped for showering or for use in other personal hygienic activities. This may due to several technical difficulties. First and foremost, it is relatively difficult to install a filtering system in a relatively compact environment (e.g. in a typical bathing area). Second, there is no single solution for a filter system which is capable of accommodating showering system with or without extension tubes. In other words, two kinds of filtering system must be developed for fitting these two kinds of conventional showering systems. This problem presents substantial costing issues. Third, one may need to resolve the problem of changing filter cores. For example, if any filter system is implemented within behind the wall of a bathroom, the user is not able to conveniently change the filter core. Finally, if different personal hygienic activities require installation of different filter systems, this impart substantial installation and maintenance cost on the part of the user. All these make any filter system for person hygienic activities economically and technically unattractive.

SUMMARY OF THE PRESENT INVENTION

An object of the present invention is to provide a filter unit for a shower system which is capable of providing filtered water for showering and other related daily hygienic activities, such as teeth brushing.

Another object of the present invention is to provide a filter unit for a shower system which is capable of resolving the above-mentioned problems, wherein the filter unit easy to be installed and disassembled in a bathing area. Moreover, the filter unit of the present invention allows the user to change filter core very easily.

Another object of the present invention is to provide a filter unit for a shower system, wherein the filter unit is capable of removing unwanted substances from tap water so as to ensure that a user of the present invention is able take person hygienic activity by water having optimal quality.

Another object of the present invention is to provide a filter unit for a shower system which does not involve expensive or complicated mechanical structure or installation process. As a result, the manufacturing and the operation cost of the present invention can be optimally minimized in light of above objectives.

Accordingly, in order to accomplish the above objects, the present invention provides a filter unit for a shower system having at least one shower head and an extension tube for connecting with a water supply tube, wherein the extension tube has a first end connected with the shower head, and a second end adapted for connecting with the filter unit, wherein the filter unit comprises:

a filtering housing comprising a main body having a water inlet and a plurality of water outlets, wherein the water inlet is arranged to connect with the water supply tube so as to allow water to flow into the filtering housing through the water inlet, wherein one of the water outlets is connected with the second end of the extension tube; and a filter core which is received in the filtering housing, and is capable of filtering unwanted substances in the water flowing from the water supply tube, wherein the filtered water is guided to flow out of the filtering housing through one of the corresponding water outlet to the extension tube and the shower head.

These and other objectives, features, and advantages of the present invention will become apparent from the following detailed description, the accompanying drawings, and the appended claims.

DETAILED DESCRIPTION OF THE PREFERRED EMBODIMENT

Figure 1:
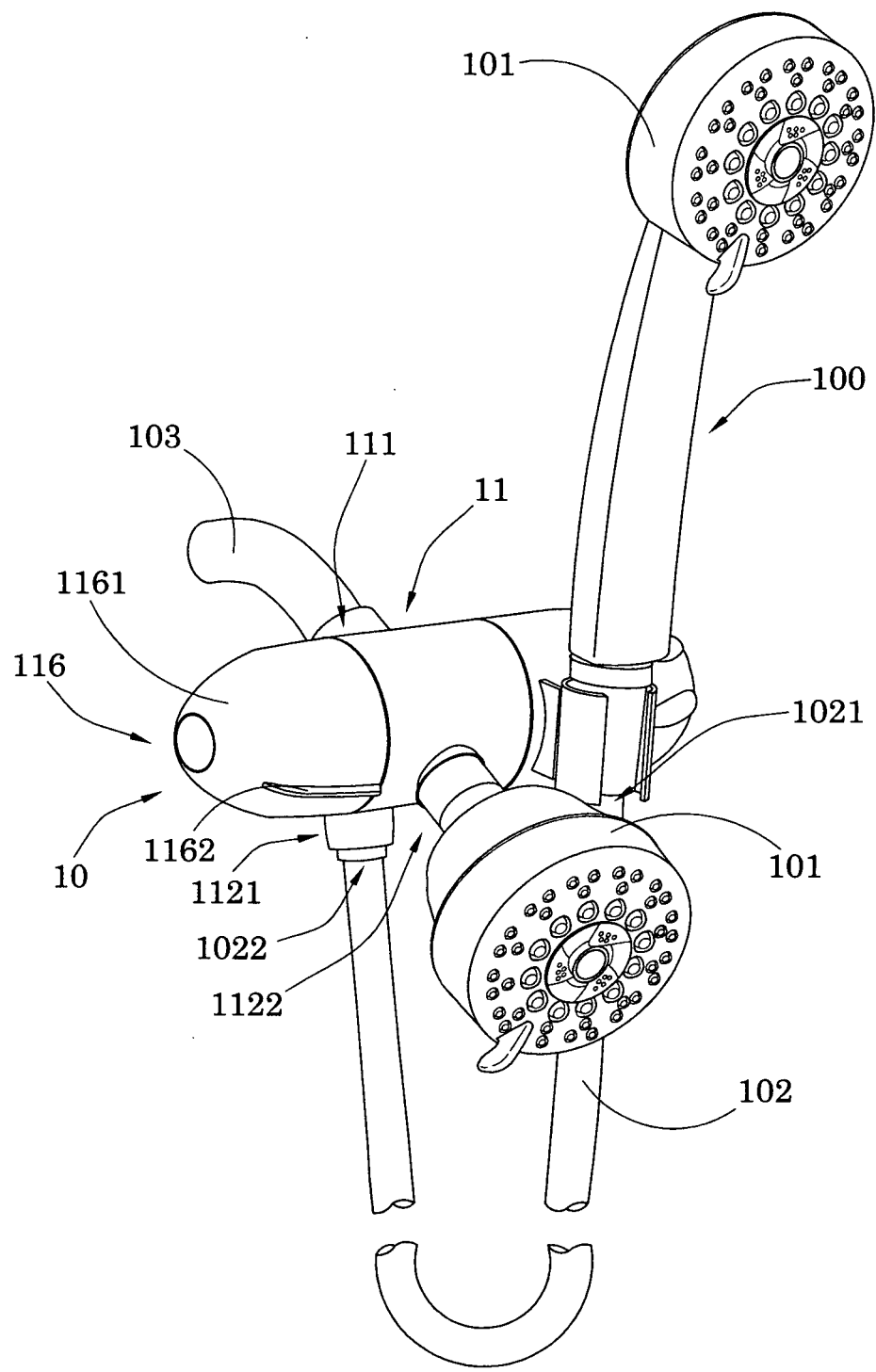
FIG. 1 is a perspective view of a filter unit for a shower head according to a preferred embodiment of the present invention.
Figure 2:
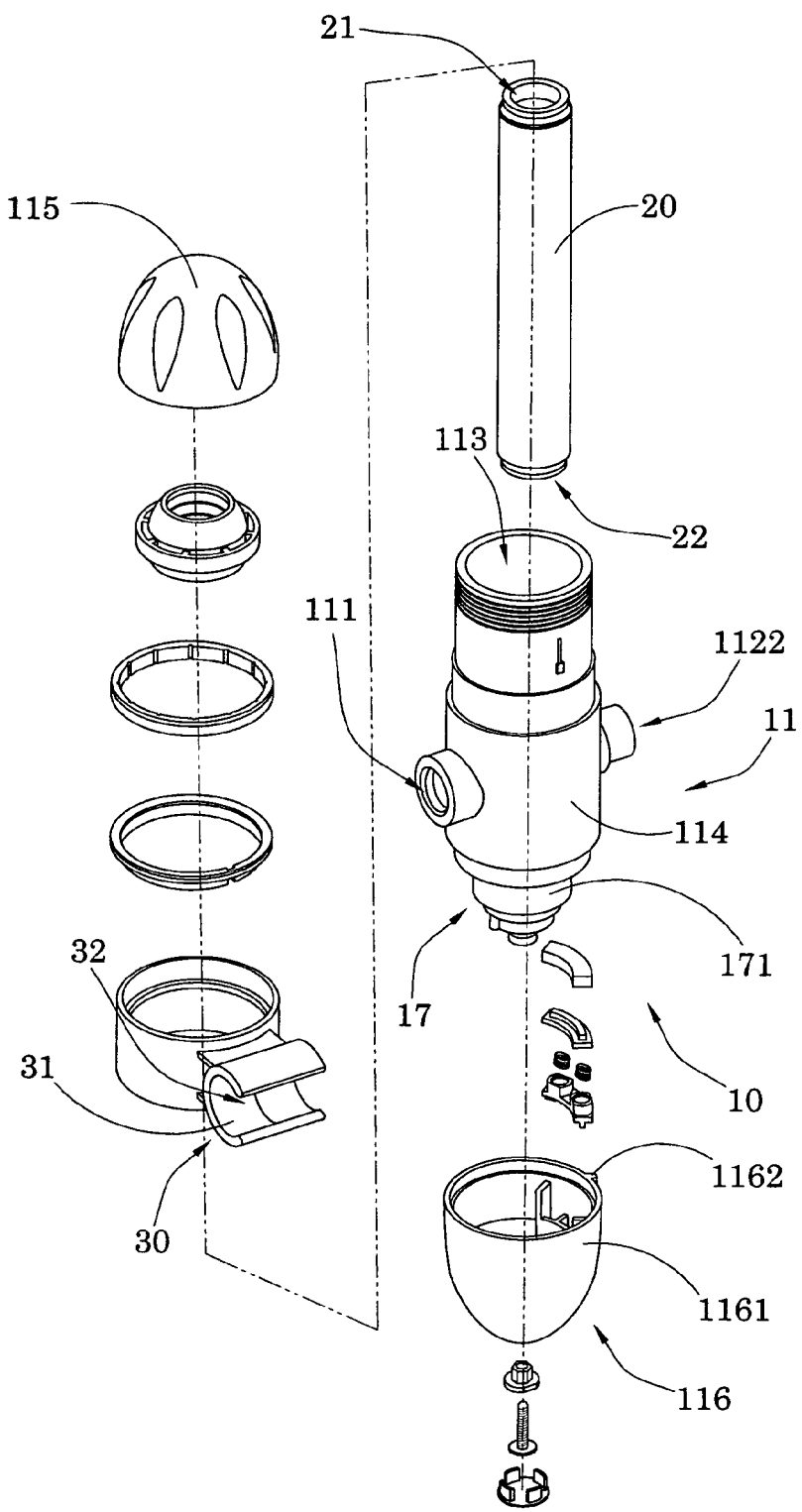
FIG. 2 is an exploded perspective view of the filter unit according to the above preferred embodiment of the present invention.

Referring to FIG. 1 to FIG. 4, FIG. 5A to FIG. 5C and FIG. 6A to FIG. 6C of the drawings, a filter unit according to a preferred embodiment of the present invention is illustrated. The filter unit is for use in conjunction with a domestic shower system 100 having at least one shower head 101, and an extension tube 102 for connecting with a water supply tube 103, wherein the extension tube 102 has a first end 1021 connected with the shower head 101, and a second end 1022 adapted for connecting with the filter unit. The filter unit comprises a filtering housing 10 and a filter core 20. Note that the water supply tube 103 is connected to a water supply for a domestic dwelling so that the shower system, if not equipped with the filter unit of the present invention, directly provide tap water for a user to conduct showering.

The filtering housing 10 comprises a main body 11 having a water inlet 111 and a plurality of water outlets (namely a first water outlet 1121 and a second water outlet 1122), wherein the water inlet 111 is arranged to connect with the water supply tube 103 so as to allow water to flow into the filtering housing 10 through the water inlet 111, wherein one of the water outlets 1121 (1122) is connected with the second end 1022 of the extension tube 102. Furthermore, the main body 11 defines a receiving compartment 113 formed therein for replaceably receiving the filter core 20 within the receiving compartment 113.

The filter core 20 is received in the filtering housing 10, and is capable of filtering unwanted substances in the water flowing from the water supply tube 103, wherein the filtered water is guided to flow out of the filtering housing 10 through one of the corresponding water outlets 1121 (1122) to the extension tube 102 and the shower head 101, so that a user is able to perform a personal hygienic activity, such as taking a shower, by using optimally filtered water coming out from the filtering housing 10. The filter core 20 further comprises a plurality of filtering materials such as a predetermined amount of active carbon or other conventional filtering materials for removing unwanted substances from tap water.

According to the preferred embodiment of the present invention, the filtering housing 10 is elongated in shape so as to minimize the space for accommodating it in a usually compact bathing area. According to this particular preferred embodiment of the present invention, the filtering housing 10 has a substantially circular cross section wherein the water inlet 111 is positioned at a top side of the main body 11, and the water outlets 1121 (1122) are position at a bottom side and a front side of the main body 11 respectively for providing optimally filtered water at these two directions of the main body 11 respectively. Obviously, the water inlet 111 and the water outlets 1121 (1122) can be formed at any positions on the main body 11 so as to fit different application circumstances in different domestic environments, and these variations are well within the scope of the present invention.

Moreover, the filtering housing 10 further comprises a shower holder 30 extended from the main body 11 for selectively and suspendedly supporting the shower head 101 above the filtering housing 10. The shower holder 30 comprises a holder body 31 preferably having a C-shaped cross section to define a holding slot 32, wherein a bottom portion of the shower head 101 is detachably inserted through the holding slot 32 for being suspendedly held at a position above the filtering housing 10.

Figure 3:
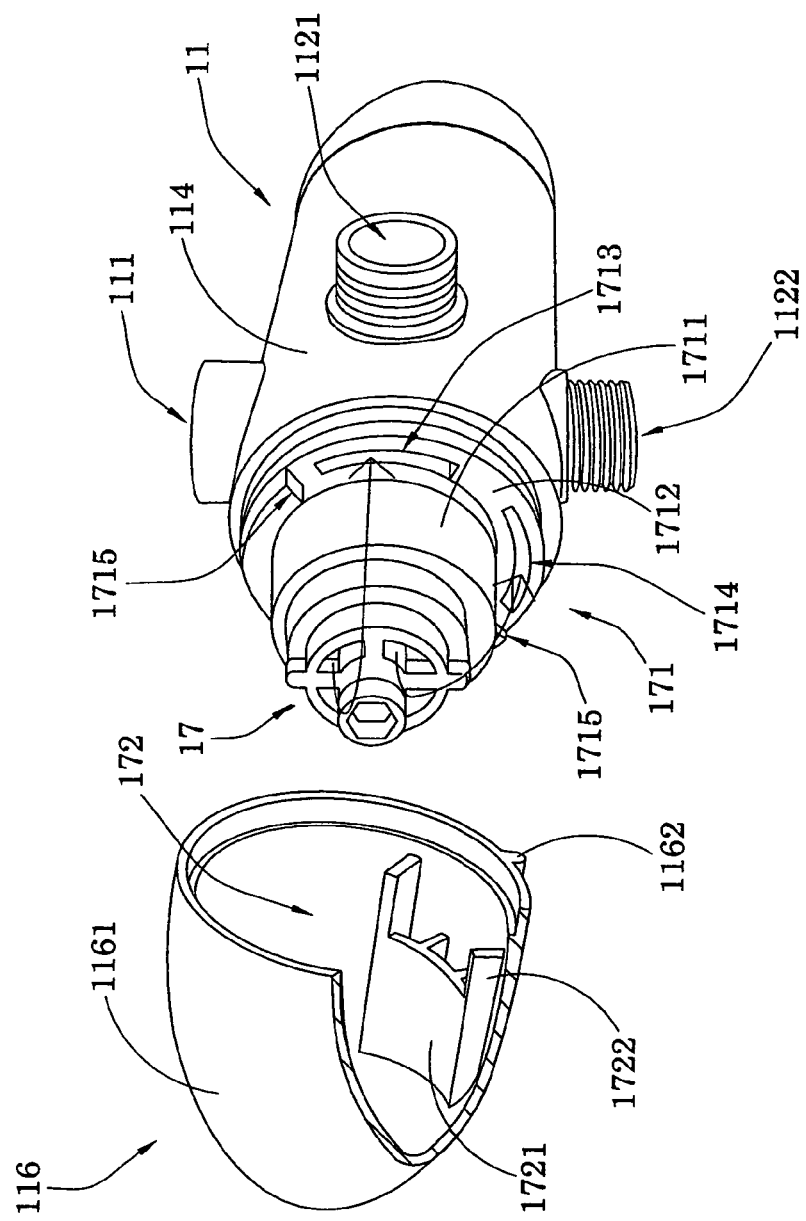
FIG. 3 is schematic diagram of the filter unit according to the above preferred embodiment of the present invention.
Figure 4:
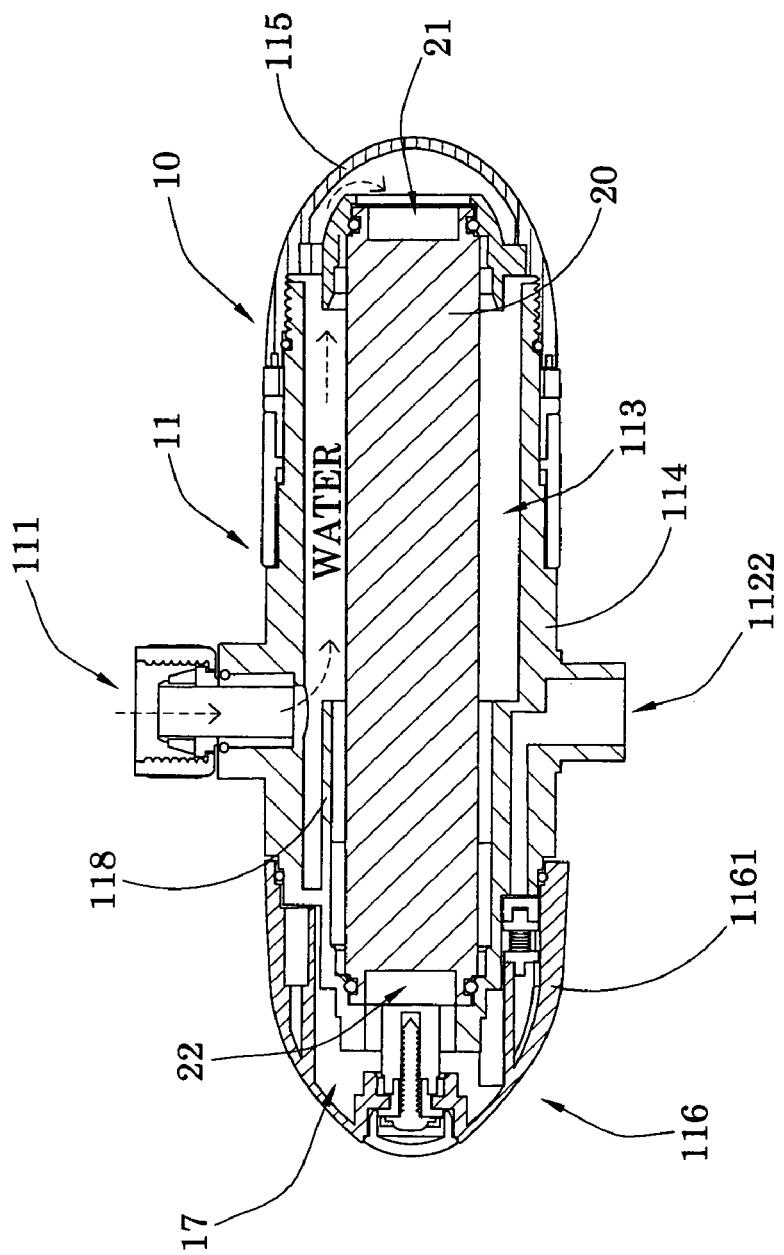
FIG. 4 is a sectional side view of the filter unit for a shower head according to the above preferred embodiment of the present invention.
Figure 5A:
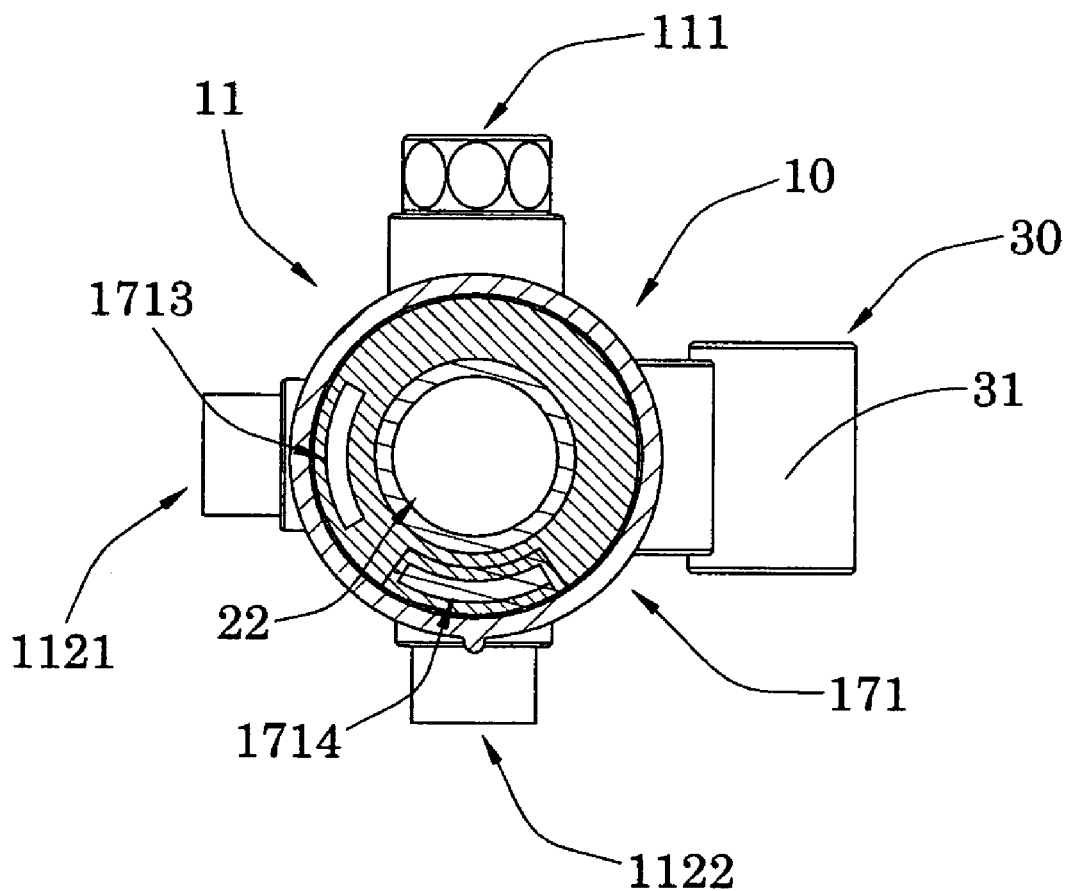
FIG. 5A to FIG. 5C are schematic diagrams of the filter unit for a shower head according to the above preferred embodiment of the present invention.
Figure 5B:
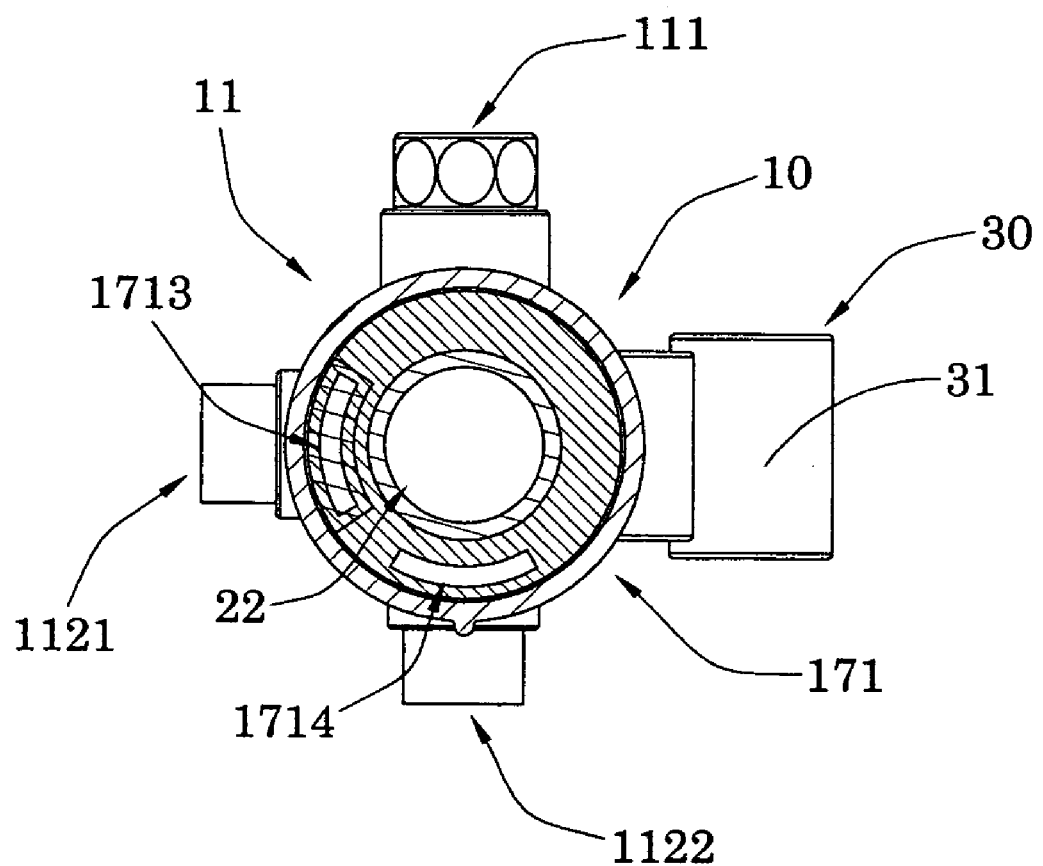
Figure 5C:
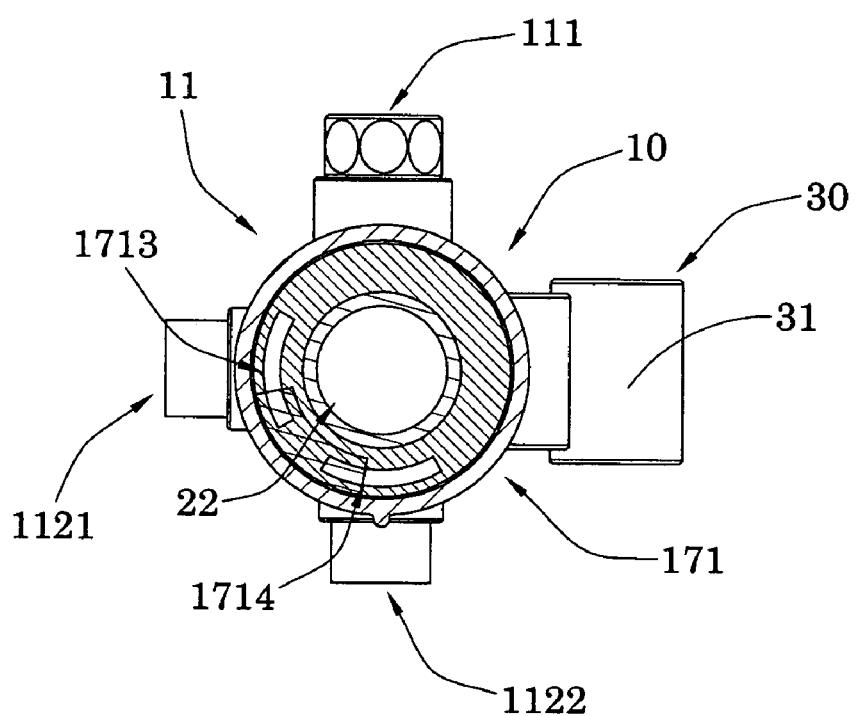
Figure 6A:
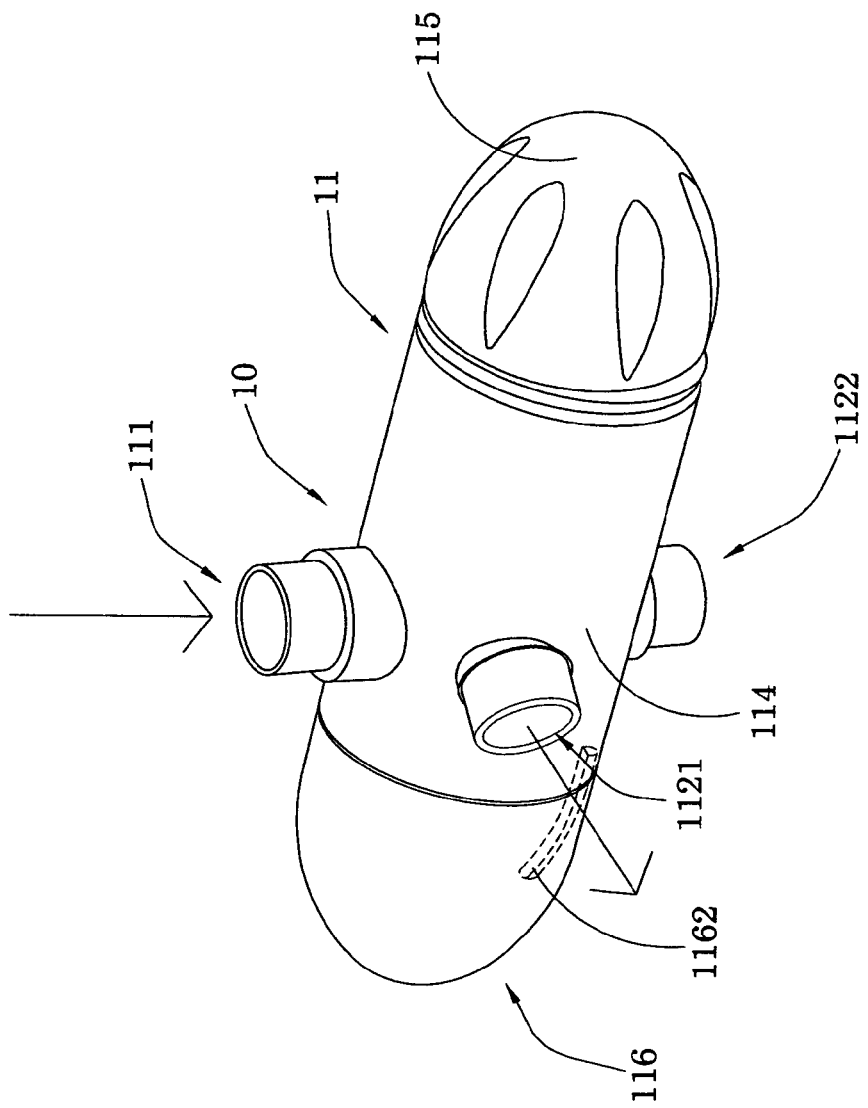
FIG. 6A to FIG. 6C are schematic diagrams of the filter unit for a shower head according to the above preferred embodiment of the present invention, illustrating the flow of water at the water outlets.
Figure 6B:
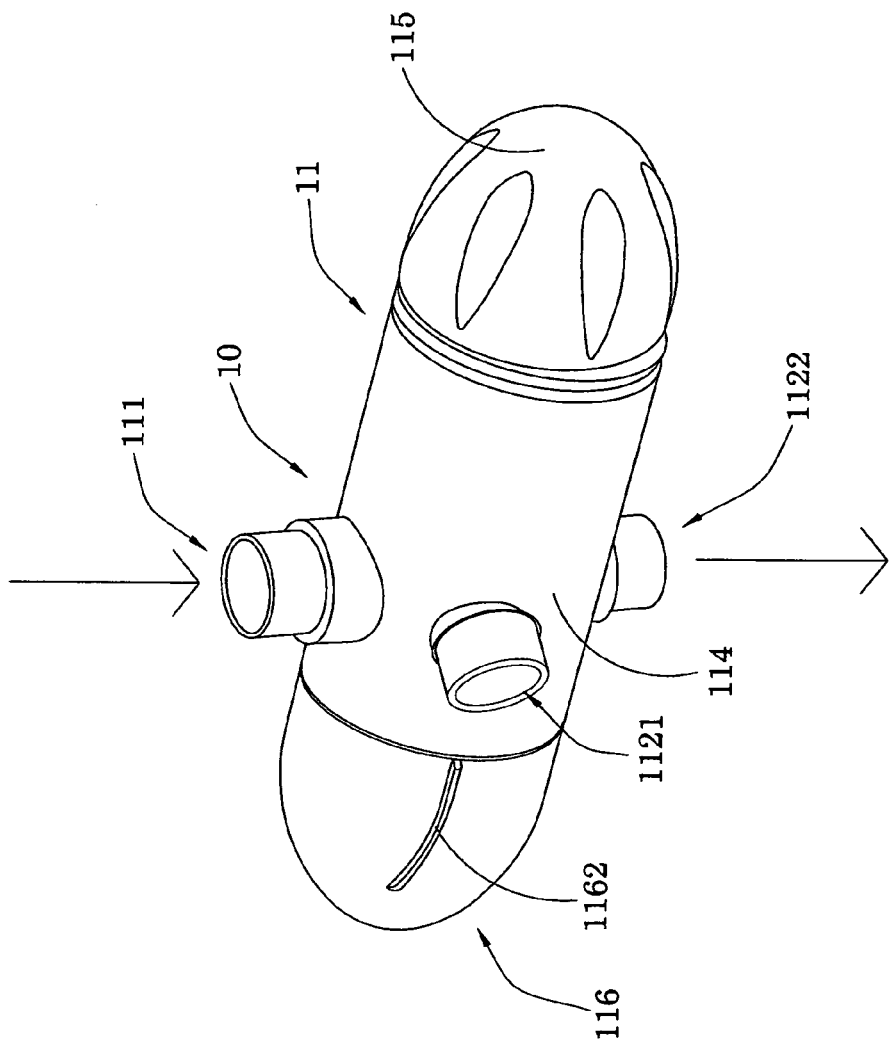
Figure 6C:
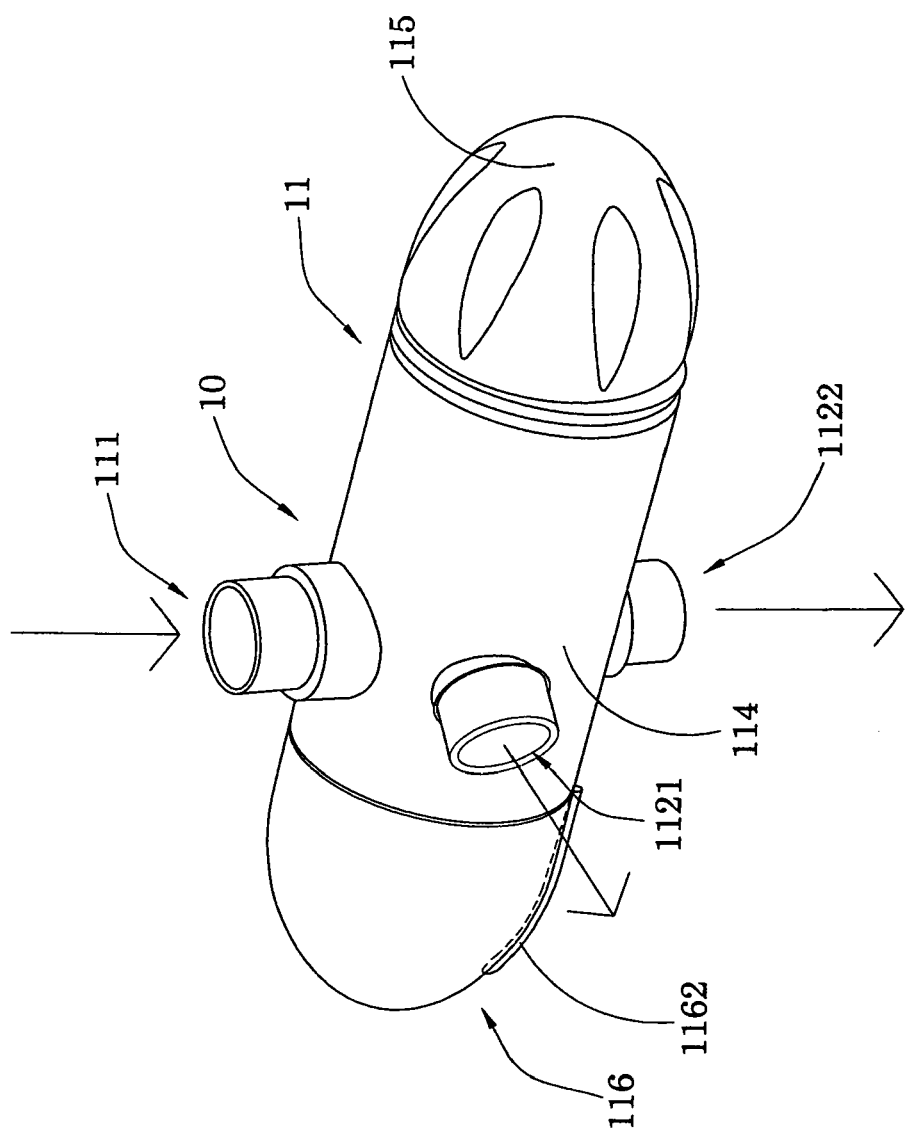

The main body 11 comprises a central body 114, a filter replacement cap 115 rotatably coupled with one side portion of the central body 114, and an operational actuator 116 movably provided at another side portion of the central body 114 for allowing the user to actuate a specific mode of operation of the filter unit. The filter replacement cap 115 and the operational actuator 116 preferably have the same cross sectional shape as that of the central body 114. In this particular embodiment, the central body 114, the filter replacement cap 115 and the operational actuator 116 all have a substantially circular cross section, though each of them may have a slightly different diameter. It is worth mentioning that the receiving compartment 113 longitudinally extends across the central body 114, the filter replacement cap 115 and the operation actuator 116 as shown in FIG. 3 of the drawings.

The filter replacement cap 115 and the corresponding side portion of the central body 114 are preferably threaded so that the filtering replacement cap 115 is arranged to rotatably mount onto the side body 114 through thread engagement between the threaded portion of the filter replacement cap 115 and the central body 114.

On the other hand, the operational actuator 116 comprises an actuating cap 1161 rotatably coupled with a corresponding side portion of the main body 114, wherein the actuating cap 1161 is capable of rotatably moving between a first position, a second position and a third position, wherein when the actuating cap 1161 is in the first position, filtered water is arranged to flow out of the filtering housing 10 only from the first water outlet 1121, wherein when the actuating cap 1161 is in the second position, filtered water is arranged to flow out of the filtering housing 10 only from the second water outlet 1122, wherein when the actuating cap 1161 is in the third position, filtered water is arranged to flow out from both the first and the second water outlet 1121, 1122.

The filter core 20 is disposed within the receiving compartment 113 for filtering predetermined unwanted substances in the tap water, and has a filter inlet 21 for allowing the tap water to flow into the filter core 20, and a filter outlet 22 for allowing the filtered water to flow out of the filter core 20. In this particular embodiment of the present invention, the filter inlet 21 and the filter outlet 22 are formed at two ends of the filter core 20 respectively, wherein the filter inlet 21 is formed at the end in the vicinity of the filter replacement cap 115, while the filter outlet 22 is formed at the end in the vicinity of the operational actuator 116.

The filtering housing 10 further comprises a flow control arrangement 17 provided therein for controlling a flow path of the filtered water so as to accomplish the operational feature of the actuating cap 1161 as mentioned earlier. More specifically, the flow control arrangement 17 comprises a flow adjustment gate 171 integrally formed at the central body 14 for forming a water flow channel between the filter outlet 22 and the water outlets 1121, 1122, wherein the flow adjustment gate 171 comprises an outlet gate 1711 aligning with the filter outlet 22 of the filter core 20, and a control gate 1712 communicating with the first and the second water outlets 1121, 1122 and is spacedly apart from the outlet gate 1711. The outlet gate 1711 has a diameter smaller than a diameter of the control gate 1712, and the diameters of both the outlet gate 1711 and the control gate 172 are smaller than a diameter of the main body 114 so as to form the water flow channel between the outlet gate 1711 and the control gate 1712.

The control gate 1712 has a first and a second elongated slot 1713, 1714 spacedly formed thereon for communicating with the first and the second water outlets 1121, 1122 respectively. On the other hand, the flow control arrangement 17 further comprises a blocking latch 172 formed at an inner side of the actuating cap 1161 of the operational actuator 116 for selectively or partially blocking a flow of water from the outlet gate 1711 to the first and the second water outlet 1121, 1122 when the actuating cap 1161 is moved between the first position, and second position and the third position.

The blocking latch 172 comprises a blocking platform 1721 inwardly and radially extended from an inner surface of the actuating cap 1161, wherein the blocking platform 1721 has two biasing ridges 1722 formed as two sidewalls of the blocking platform 1721, whereas the control gate 1712 further has two biasing shoulders 1715 spacedly formed thereon around two outmost ends of the two elongated slots 1713, 1714 for selectively engaging with the two biasing ridges 1722 respectively. In other words, the actuating cap 1161 is normally capable of rotating with respective to the main body 11 until a biasing ridge 1722 biases against the corresponding biasing shoulder 1715 of the control gate 1712. At that time, the rotational movement of the actuating cap 1161 is restricted by the engagement between the corresponding biasing ridge 1722 and the biasing shoulder 1715. The two biasing ridges 1722 and the biasing shoulders 1715 serve to limit the extent to which the actuating cap 1161 is capable of rotating with respective to the central body 114. Furthermore, each of the elongated slots 1713, 1714 exclusively communicate the first and the second water outlets 1121, 1122 with the outlet gate 1711 so that the water flowing through one of the elongated slots 1713 will not be able to pass through another elongated slot 1714. In other words, the control gate 1712 has a dividing wall dividing the two elongated slots 1713, 1714.

The operation of the present invention is as follows: the tap water initially flows into the filtering housing 10 through the water inlet 111. The tap water is then guided to flow into the filter core 20 through the filter inlet 21. In order to do so, the main body 11 further comprises a fluid guider 118 provided at the water inlet 111 and is arranged to block a particular direction of fluid flow at the water inlet 111. In this particular embodiment, the fluid guider 118 is arranged to block the water flowing into the direction of the filter outlet 22, so as to ensure that the tap water entering the filtering housing 10 is guided to flow into the filter core 20 through the filter inlet 21.

As shown in FIG. 5A to FIG. 5C and FIG. 6A to FIG. 6C of the drawings, predetermined unwanted substances contained in the tap water are filtered by the filter core 20, and the filtered water is arranged to come out of the filter core 20 through the filter outlet 22. The exact subsequent path of the filtered water after coming out of the filter core 20 depends on the position of the actuating cap 1161. When the actuating cap 1161 is in the first position, the blocking latch 172 blocks the water going to the second elongated slot 1714 and the filtered water will then be guided to flow into the first elongated slot 1713 and the filtered water will then go out of the filtering housing 10 through the first water outlet 1121 only. When the actuating cap 1161 is in the second position, the blocking latch 172 blocks the water going to the first elongated slot 1713 and the filtered water will then be guided to flow into the second elongated slot 1714 and the filtered water will then go out of the filtering housing 10 through the second water outlet 1122 only. When the actuating cap 1161 is in the third position, the blocking latch 172 merely partially blocks first and the second elongated slots 1713, 1714 and allow the filtered to through into both the first and the second elongated slots 1713, 1714. The result is that the filtered water is then allowed to flow out of the filtering housing 10 through both the first and the second water outlet 1121, 1122 simultaneously. Note that in this preferred embodiment of the present invention, the third position is somewhere between the first and the second position. The actuating cap 1161 further has a position indicator 1162 for indicating the position of the actuating cap 1161.

As shown in FIG. 1 of the drawings, each of the water outlets 1121, 1122 is readily for use by a shower head or other personal hygienic accessory so that the user may selectively or simultaneously perform one or more corresponding hygienic activities. For example, the user may use the first water outlet 1121 for showering, and the second outlet 1122 for brushing his or her teeth, both with optimally filtered water.

Figure 7:
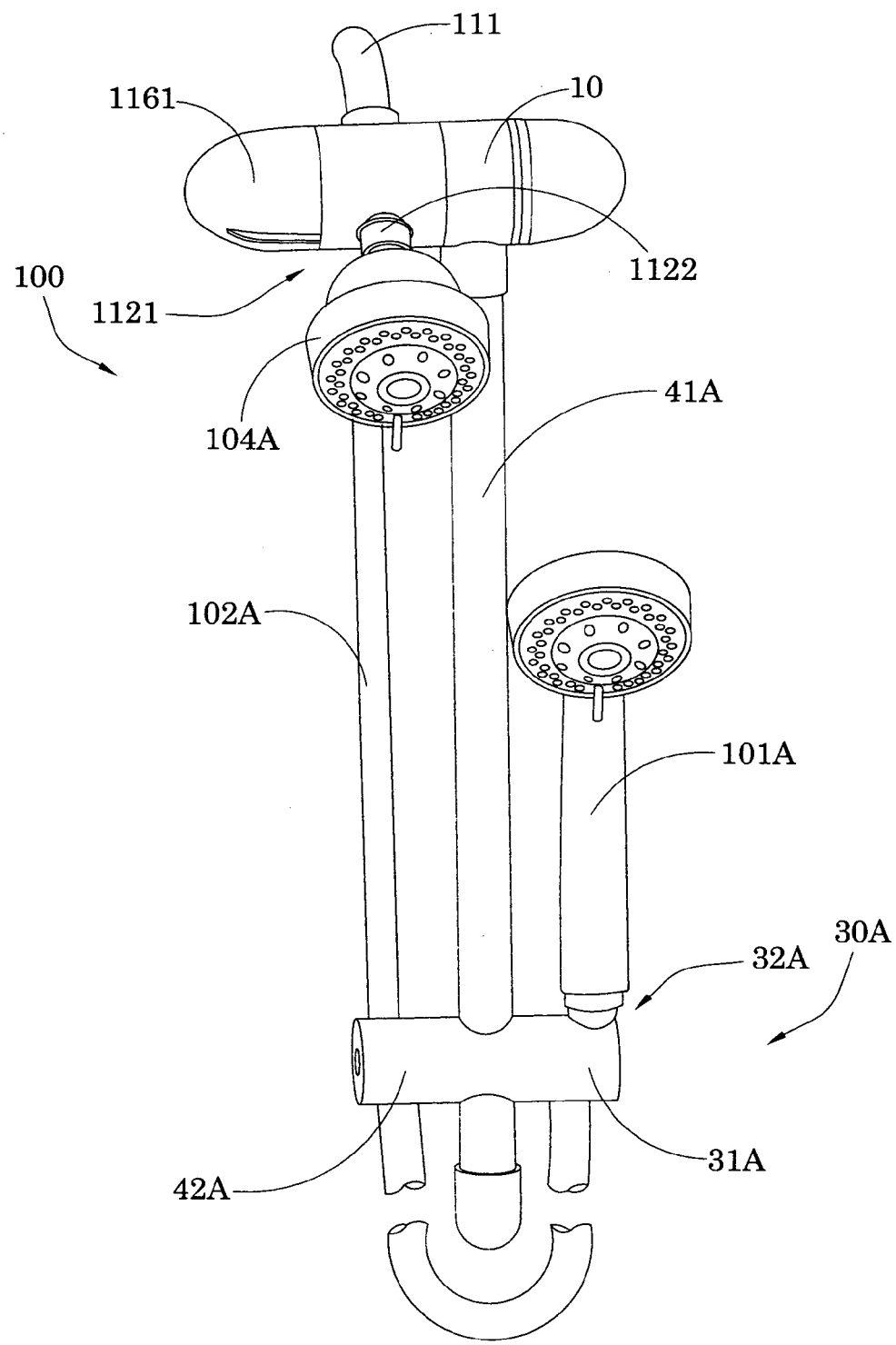
FIG. 7 illustrates the filter unit incorporating with a dual-shower head system according to the above preferred embodiment of the present invention.

As shown in FIG. 7, the filter unit of the present invention is adapted to incorporate with the dual shower head system 100A which comprises a water supply tube 103A connecting to the water inlet 111 of the filtering housing 10, a hand-held shower head 101A connecting to the first water outlet 1121 via an extension tube 102A, and a suspending shower head 104A rotatably connecting to the filtering housing 10 at the second water outlet 1122. Therefore, the user is able to select one of the hand-held shower head 101A and the suspending shower head 104 for showering. When the actuating cap 1161 is in the first position, the filtered water is guided to flow out of the filtering housing 10 through the first water outlet 1121 towards the hand-held shower head 101A. When the actuating cap 1161 is in the second position, the filtered water is guided to flow out of the filtering housing 10 through the second water outlet 1122 towards the suspending shower head 104A.

As shown in FIG. 7, the filter unit further comprises a holding frame 40A for detachably holding the hand-held shower head 101A, wherein the holding frame 40A comprises an elongated retention member 41A downwardly and transversely extended from the filtering housing 10 and an elongated holding member 42A perpendicularly and rotatably extended from the retention member 41A to form a cross structure.

Accordingly, the retention member 41A has an upper end perpendicularly extended from the filtering housing 10 and a bottom end portion rotatably coupled with the holding member 42A. The holding member 42A further comprises a shower holder 30A provided at one end of the holding member 42A, wherein the shower holder 30A comprises a holder body 31A preferably having a C-shaped cross section to define a holding slot 32A, wherein a bottom portion of the hand-held shower head 101A is detachably inserted through the holding slot 32A for being suspendedly held at a position below the filtering housing 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A filter unit for a shower system having at least one shower head and an extension tube for connecting with a water supply tube, wherein said extension tube has a first end connected with said shower head, and a second end adapted for connecting with said filter unit, wherein said filter unit comprises:

a filtering housing, which has a receiving compartment, comprising a main body having a water inlet and a plurality of water outlets and a flow control arrangement provided therein, wherein said water inlet is arranged to connect with said water supply tube so as to allow water to flow into said filtering housing through said water inlet, wherein one of said water outlets is connected with said second end of said extension tube, wherein said main body comprises a central body, a filter replacement cap rotatably coupled with one side portion of said central body, and an operational actuator movably provided at another side portion of said central body for allowing said user to actuate a specific mode of operation of said filter unit, wherein said receiving compartment longitudinally extends across said central body, said filter replacement cap and said operational actuator, wherein said operational actuator comprises an actuating cap rotatably coupled with said corresponding side portion of said main body, wherein said actuating cap is capable of rotatably moving between a first position, a second position and a third position; and a filter core which is received in said receiving compartment of said filtering housing, and is capable of filtering unwanted substances in said water flowing from said water supply tube, wherein said filtered water is guided to flow out of said filtering housing through one of said corresponding water outlets to said extension tube and said shower head, wherein when said actuating cap is in said first position, said filtered water is arranged to flow out of said filtering housing only through said first water outlet, wherein when said actuating cap is in said second position, said filtered water is arranged to flow out of said filtering housing only through said second water outlet, wherein when said actuating cap is in said third position, filtered water is arranged to flow out through both said first and said second water outlet simultaneously, wherein said filter core has a filter inlet for allowing said water to flow into said filter core, and a filter outlet for allowing said filtered water to flow out of said filter core, wherein said filter inlet and said filter outlet are formed at two end portions of said filter core respectively, in such a manner that said filter inlet is formed at said end portion in a vicinity of said filter replacement cap, while said filter outlet is formed at said end portion in a vicinity of said operational actuator, wherein said flow control arrangement provided in said filtering housing is for controlling a flow path of said filtered water, wherein said flow control arrangement comprises a flow adjustment gate integrally formed at said central body for forming a water flow channel between said filter outlet and said water outlets, wherein said flow path of said filtered water is arranged to flow out of said filtering housing at said predetermined water outlets in accordance with said position of said actuating cap.

2. The filter unit, as recited in claim 1, wherein said flow adjustment gate comprises an outlet gate aligning with said filter outlet of said filter core, and a control gate communicating with said first and said second water outlets and is spacedly apart from said outlet gate, wherein said outlet gate has a diameter smaller than a diameter of said control gate, and said diameters of said outlet gate and said control gate are smaller than a diameter of said main body so as to form said water flow channel between said outlet gate and said control gate.

3. The filter unit, as recited in claim 2, wherein said control gate has a first and a second elongated slot spacedly formed thereon for communicating with said first and said second water outlets respectively, wherein said flow control arrangement further comprises a blocking latch formed at an inner side of said actuating cap of said operational actuator for selectively blocking a flow of filtered water from said outlet gate to said first and said second water outlets when said actuating cap is moved between said first position, said second position and said third position.

4. The filter unit, as recited in claim 3, wherein said blocking latch comprises a blocking platform inwardly and radially extended from an inner surface of said actuating cap, wherein said blocking platform has two biasing ridges formed as two sidewalls of said blocking platform, whereas said control gate further has two biasing shoulders spacedly formed thereon around two outmost ends of said two elongated slots for selectively engaging with said two biasing ridges respectively, such that said actuating cap is normally capable of rotating with respective to said main body until one of said biasing ridges biases against said corresponding biasing shoulder of said control gate.

5. The filter unit, as recited in claim 1, wherein said filtering housing further comprises a shower holder extended from said main body for selectively and suspendedly supporting said shower head above said filtering housing.

6. The filter unit, as recited in claim 4, wherein said filtering housing further comprises a shower holder extended from said main body for selectively and suspendedly supporting said shower head above said filtering housing.

7. A shower system connecting with a water supply tube, comprising:

at least one shower head;

an extension tube for connecting with a water supply tube, wherein said extension tube has a first end connected with said shower head, and a second end adapted for connecting with said filter unit; and a filter unit, which comprises:

a filtering housing, which has a receiving compartment, comprising a main body having a water inlet and a plurality of water outlets and a flow control arrangement provided therein, wherein said water inlet is arranged to connect with said water supply tube so as to allow water to flow into said filtering housing through said water inlet, wherein one of said water outlets is connected with said second end of said extension tube, wherein said main body comprises a central body, a filter replacement cap rotatably coupled with one side portion of said central body, and an operational actuator movably provided at another side portion of said central body for allowing said user to actuate a specific mode of operation of said filter unit, wherein said receiving compartment longitudinally extends across said central body, said filter replacement cap and said operational actuator, wherein said operational actuator comprises an actuating cap rotatably coupled with said corresponding side portion of said main body, wherein said actuating cap is capable of rotatably moving between a first position, a second position and a third position; and a filter core which is received in said receiving compartment of said filtering housing, and is capable of filtering unwanted substances in said water flowing from said water supply tube, wherein said filtered water is guided to flow out of said filtering housing through one of said corresponding water outlet to said extension tube and said shower head, wherein when said actuating cap is in said first position, said filtered water is arranged to flow out of said filtering housing only through said first water outlet, wherein when said actuating cap is in said second position, said filtered water is arranged to flow out of said filtering housing only through said second water outlet, wherein when said actuating cap is in said third position, filtered water is arranged to flow out through both said first and said second water outlets simultaneously, wherein said filter core has a filter inlet for allowing said water to flow into said filter core, and a filter outlet for allowing said filtered water to flow out of said filter core, wherein said filter inlet and said filter outlet are formed at two end portions of said filter core respectively, in such a manner that said filter inlet is formed at said end portion in a vicinity of said filter replacement cap, while said filter outlet is formed at said end portion in a vicinity of said operational actuator, wherein said flow control arrangement provided in said filtering housing is for controlling a flow path of said filtered water, wherein said flow control arrangement comprises a flow adjustment gate integrally formed at said central body for forming a water flow channel between said filter outlet and said water outlets, wherein said flow path of said filtered water is arranged to flow out of said filtering housing at said predetermined water outlets in accordance with said position of said actuating cap.

8. The shower system, as recited in claim 7, wherein said flow adjustment gate comprises an outlet gate aligning with said filter outlet of said filter core, and a control gate communicating with said first and said second water outlets and is spacedly apart from said outlet gate, wherein said outlet gate has a diameter smaller than a diameter of said control gate, and said diameters of said outlet gate and said control gate are smaller than a diameter of said main body so as to form said water flow channel between said outlet gate and said control gate.

9. The shower system, as recited in claim 8, wherein said control gate has a first and a second elongated slot spacedly formed thereon for communicating with said first and said second water outlets respectively, wherein said flow control arrangement further comprises a blocking latch formed at an inner side of said actuating cap of said operational actuator for selectively blocking a flow of filtered water from said outlet gate to said first and said second water outlets when said actuating cap is moved between said first position, said second position and said third position.

10. The shower system, as recited in claim 9, wherein said blocking latch comprises a blocking platform inwardly and radially extended from an inner surface of said actuating cap, wherein said blocking platform has two biasing ridges formed as two sidewalls of said blocking platform, whereas said control gate further has two biasing shoulders spacedly formed thereon around two outmost ends of said two elongated slots for selectively engaging with said two biasing ridges respectively, such that said actuating cap is normally capable of rotating with respective to said main body until one of said biasing ridges biases against said corresponding biasing shoulder of said control gate.

11. The shower system, as recited in claim 10, wherein said filtering housing further comprises a shower holder extended from said main body for selectively and suspendedly supporting said shower head above said filtering housing, wherein said shower system further comprises an additional shower head detachably connected with another of said water outlets so as to allow a user to perform more than one personal hygienic activity simultaneously.

* * * * *